US012668482B1

(12) United States Patent
Weske

(10) Patent No.: US 12,668,482 B1
(45) Date of Patent: Jun. 30, 2026

(54) REFUELING NOZZLE COVER DEVICE

(71) Applicant: Adam Weske, Clark Fork, ID (US)

(72) Inventor: Adam Weske, Clark Fork, ID (US)

( * ) Notice: Subject to any disclaimer, the term of this patent is extended or adjusted under 35 U.S.C. 154(b) by 0 days.

(21) Appl. No.: 19/001,997

(22) Filed: Dec. 26, 2024

(51) Int. Cl.
*B67D 7/06* (2010.01)
*B67D 7/42* (2010.01)

(52) U.S. Cl.
CPC .................................... *B67D 7/421* (2013.01)

(58) Field of Classification Search
CPC ............. B67D 7/06; B67D 7/42; B67D 7/421
See application file for complete search history.

(56) References Cited

U.S. PATENT DOCUMENTS 2,058,118 A * 10/1936 White .................... B67D 7/421 137/379
2,208,989 A * 7/1940 Lewis .................... B67D 7/421 137/379
2,505,101 A * 4/1950 Cunningham ......... B67D 7/421 137/379
2,653,747 A * 9/1953 Maida .................... B67D 7/421 137/379
2,659,523 A * 11/1953 Comber ................... B60J 11/10 141/390
2,910,098 A * 10/1959 Wood ..................... B67D 7/421 141/285
3,291,165 A * 12/1966 Fraylick ................. B67D 7/421 141/311 A
3,451,445 A * 6/1969 Sippola .................. B67D 7/421 141/285
4,040,458 A * 8/1977 Hansel ..................... B67D 7/54 141/DIG. 1
4,817,691 A * 4/1989 Lau ........................ B67D 7/421 141/390
5,365,985 A * 11/1994 Todd ........................ B67D 7/54 141/97
5,571,249 A * 11/1996 Boylen .................. B60K 15/04 141/311 A
5,692,547 A * 12/1997 Lehr ....................... B63B 17/00 114/364
5,785,099 A * 7/1998 Kashani ................. B60K 15/04 141/86
5,860,462 A * 1/1999 Alvern ................... B67D 7/421 137/379

(Continued)

FOREIGN PATENT DOCUMENTS

JP H11193099 A * 7/1999 ............... B67D 5/37
WO WO2017168367 10/2017

*Primary Examiner* — Nicolas A Arnett

(57) ABSTRACT

A refueling nozzle cover device includes a refueling nozzle that can be inserted into a refueling port of a fuel tank for refueling the fuel tank. A panel is secured to the refueling nozzle and the panel is comprised of a flexible material such that the panel can be draped over the handle of the refueling nozzle. A first magnet is secured to the refueling nozzle and a second magnet is secured to the panel. The panel is positionable to extend beyond the fuel tube to cover the refueling port of the fuel tank thereby inhibiting contaminants from passing into the refueling port when refueling nozzle is inserted into the refueling port. The second magnet is distally positioned with respect to the fuel tube when the panel pulled beyond the fuel tube to magnetically engage the fuel tank for securing the panel over the refueling port.

14 Claims, 7 Drawing Sheets

(56) References Cited

U.S. PATENT DOCUMENTS

| | | | | | |
|---|---|---|---|---|---|
| 5,975,165 | A * | 11/1999 | Motosugi | B67D 7/421 141/94 |
| 6,095,204 | A * | 8/2000 | Healy | B67D 7/54 141/210 |
| 6,112,782 | A * | 9/2000 | Farthing | B67D 7/426 141/98 |
| 7,255,138 | B2 * | 8/2007 | Coffman | B60K 15/05 141/311 A |
| 7,955,683 | B1 * | 6/2011 | Ferrell | A63B 57/60 15/209.1 |
| 8,800,609 | B1 * | 8/2014 | Krechowiecki | B60K 15/04 141/338 |
| 9,022,082 | B1 * | 5/2015 | Signalness | B67D 7/421 141/379 |
| 10,787,359 | B1 * | 9/2020 | Gaskill | B67D 7/50 |
| 11,006,789 | B2 * | 5/2021 | Yeo | A47K 10/424 |
| D963,540 | S * | 9/2022 | Chew | D12/400 |
| D1,019,071 | S * | 3/2024 | McGowan | D2/861 |
| 2009/0014087 | A1 * | 1/2009 | Fevag | B67D 7/3209 141/86 |

* cited by examiner

REFUELING NOZZLE COVER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to refueling nozzle devices and more particularly pertains to a new refueling nozzle device for inhibiting contaminants from entering a refueling port of a fuel tank when the fuel tank is being refueled. The device includes a refueling nozzle and a panel, comprised of a deformable material, which is secured to the refueling nozzle. The device includes a first magnet that is secured to the refueling nozzle and a second magnet that is secured to the panel. The panel is positionable in a stored position having the panel being wrapped around the refueling nozzle such that the first magnet magnetically engages the second magnet. The panel is positionable in a deployed position having the panel extending over the refueling port when the refueling nozzle is inserted into the refueling port to inhibit contaminants from entering the refueling port having the second magnet magnetically engaging the fuel tank to secure the panel over the refueling port.

(2) Description of Related Art Including Information Disclosed Under 37 CFR 1.97 and 1.98

The prior art relates to refueling nozzle devices including: a variety of splash guard devices that each has a bowl shape and which are positionable around a refueling port when a fuel tube is inserted into the refueling port to inhibit fuel from splashing out of the refueling port; an ornamental design for a magnetic towel that includes a towel which has a pair of pouches and a pair of magnets positioned in each pouch. In no instance does the prior art disclose a refueling nozzle cover device that includes a panel, comprised of a deformable material, which is secured to a refueling nozzle and a first magnet secured to the refueling nozzle and a second magnet secured to the panel. The panel is positionable in a stored position having the panel being wrapped around the refueling nozzle and having the first magnet magnetically engaging the second magnet. the panel is positionable in a deployed position having the panel covering a refueling port of a fuel tank when the refueling nozzle is inserted into the refueling port to inhibit contaminants from entering the refueling port having the second magnet magnetically engaging the fuel tank.

(h) BRIEF SUMMARY OF THE INVENTION

An embodiment of the disclosure meets the needs presented above by generally comprising a refueling nozzle that can be inserted into a refueling port of a fuel tank for refueling the fuel tank. A panel is secured to the refueling nozzle and the panel is comprised of a flexible material such that the panel can be draped over the handle of the refueling nozzle. A first magnet is secured to the refueling nozzle and a second magnet is secured to the panel. The panel is positionable to extend beyond the fuel tube to cover the refueling port of the fuel tank thereby inhibiting contaminants from passing into the refueling port when refueling nozzle is inserted into the refueling port. The second magnet is distally positioned with respect to the fuel tube when the panel pulled beyond the fuel tube to magnetically engage the fuel tank for securing the panel over the refueling port.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
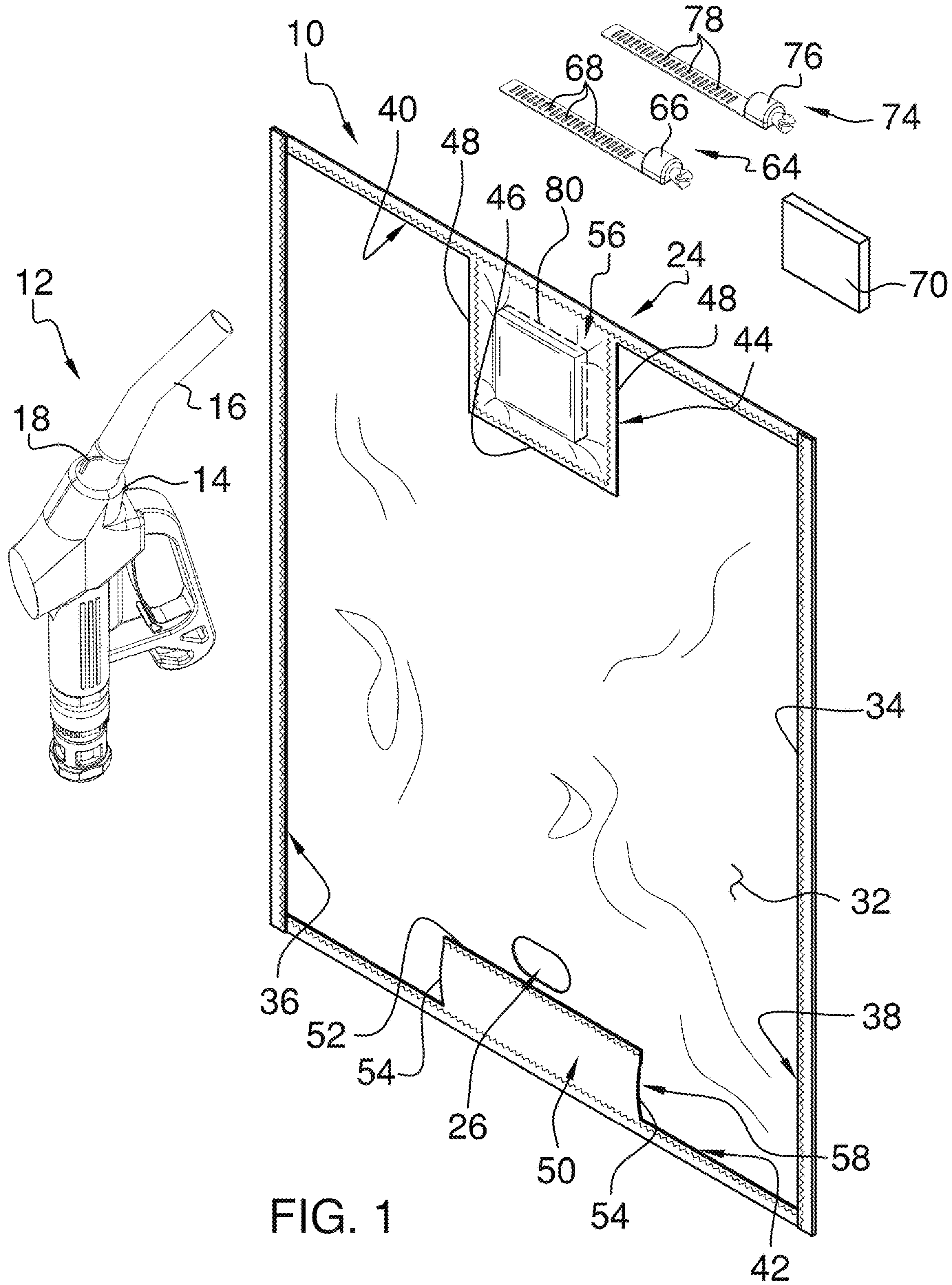
FIG. 1 is a perspective view of a refueling nozzle cover device according to an embodiment of the disclosure.
Figure 2:
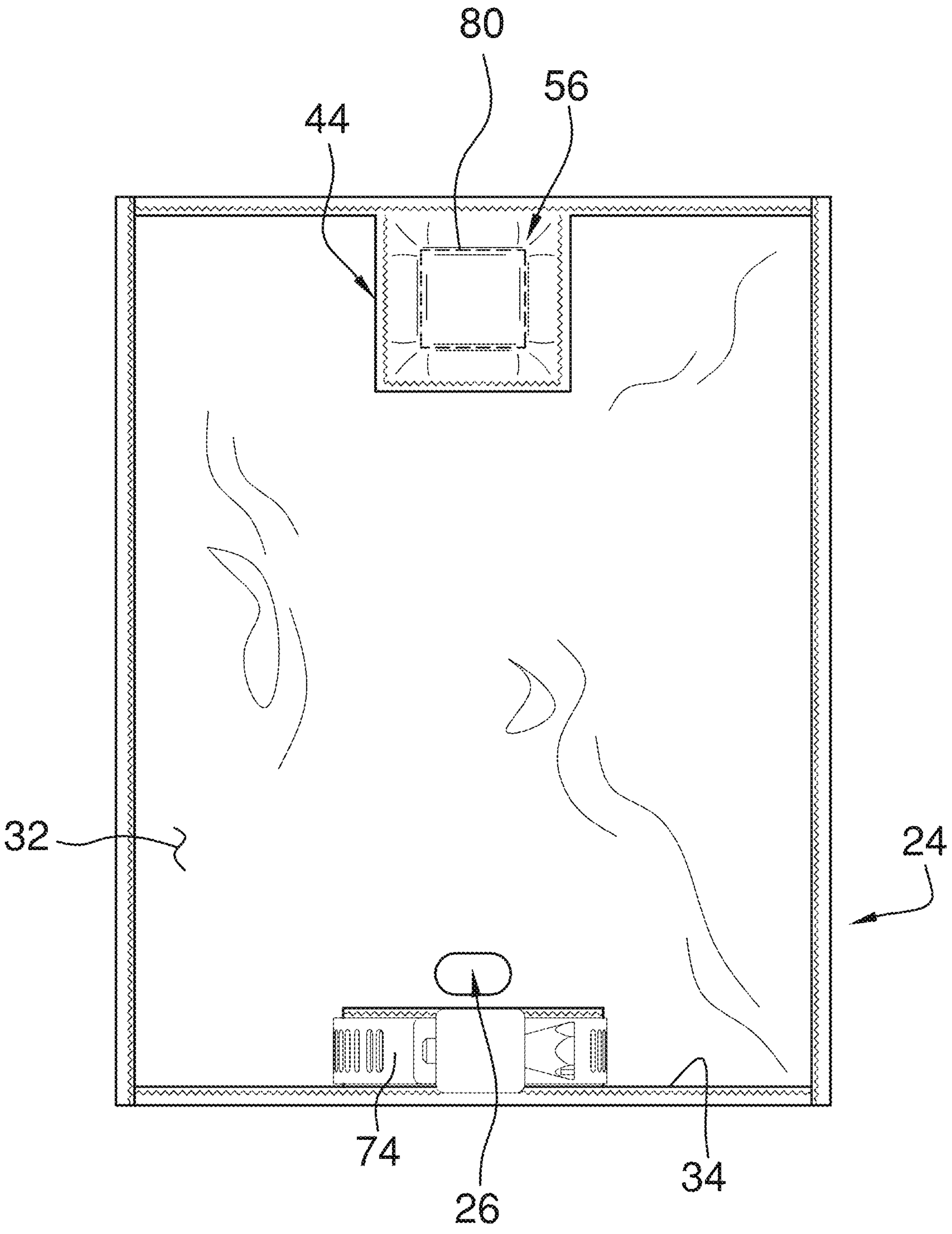
FIG. 2 is a bottom view of a panel of an embodiment of the disclosure.
Figure 3:
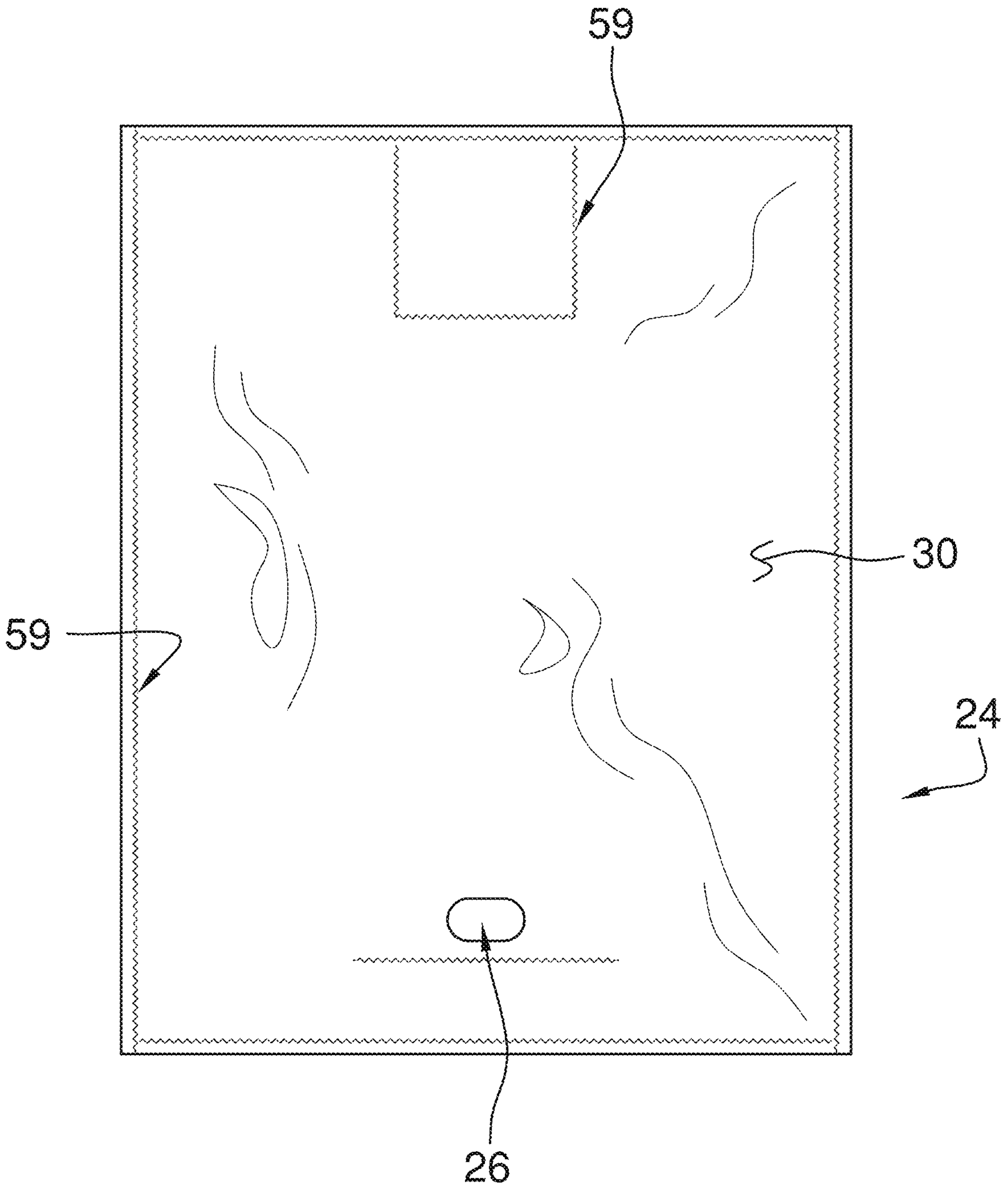
FIG. 3 is a top view of a panel of an embodiment of the disclosure.

With reference now to the drawings, and in particular to FIGS. 1 through 7 thereof, a new refueling nozzle device embodying the principles and concepts of an embodiment of the disclosure and generally designated by the reference numeral 10 will be described.

As best illustrated in FIGS. 1 through 7, the refueling nozzle cover device 10 generally comprises a refueling nozzle 12 which has a handle 14 and a fuel tube 16 and a hook 18 extending upwardly from the fuel tube 16; the fuel tube 16 can be inserted into a refueling port 20 of a fuel tank 22 for refueling the fuel tank 22. The fuel tank 22 may be a fuel tank of a motorized vehicle, for example, or any other type of fuel tank that is employed to store gasoline or diesel. Additionally, the refueling nozzle 12 may be a refueling nozzle of any conventional design that is employed on a fuel pump, such as a gas station for example, which is employed for refueling fuel tanks with gasoline or diesel.

A panel 24 is provided which has a hole 26 extending through the panel 24. The hole 26 insertably receives the hook 18 thereby attaching the panel 24 to the refueling nozzle 12. Furthermore, the panel 24 is comprised of a flexible material, including but not being limited to canvas or a synthetic textile, such that the panel 24 is positionable in a stored position having the panel 24 being draped over the handle 14 of the refueling nozzle 12 when the refueling nozzle 12 is not being employed for refueling. Conversely, the panel 24 is positionable in a deployed position having the panel 24 extending beyond the fuel tube 16 of the refueling nozzle 12 such that the panel 24 is positionable to cover the refueling port 20 of the fuel tank 22 when the fuel tube 16 is inserted into the refueling port 20. Furthermore, the panel 24 inhibit contaminants 28, including but being limited to dirt or precipitation, from passing into the refueling port 20 while the fuel tank 22 is being refueled.

The panel 24 has a top surface 30 and a bottom surface 32 and a perimeter edge 34 extending between the top surface 30 and the bottom surface 32; the perimeter edge 34 has a first lateral side 36 and a second lateral side 38 and a front side 40 and a back side 42. The front side 40 has a first tab portion 44 which has a frontmost edge 46 that extends between pair of lateral edges 48. Each lateral edge 48 of the pair of lateral edges 48 is oriented perpendicular to the front side 40 having the frontmost edge 46 being oriented parallel to the front side 40. The first tab portion 44 is centrally located between the first lateral side 36 and the second lateral side 38 of the perimeter edge 34 of the panel 24. The back side 42 of the perimeter edge 34 of the panel 24 has a second tab portion 50 which has a rearmost edge 52 extending between a pair of sidelong edges 54. Each sidelong edge 54 of the pair of sidelong edges 54 which are oriented perpendicular to the back side 42 having the rearmost edge 52 being oriented parallel to the back side 42. The second tab portion 50 is centrally located between the first lateral side 36 and the second lateral side 38 of the perimeter edge 34 of the panel 24.

The first tab portion 44 is folded over onto the bottom surface 32 of the panel 24 having each of the pair of lateral edges 48 and the frontmost edge 46 being coupled to the bottom surface 32 to define a pouch 56 between the first tab portion 44 and the bottom surface 32 of the panel 24. Additionally, the second tab portion 50 is folded over onto the bottom surface 32 of the panel 24 having the rearmost edge 52 being coupled to the bottom surface 32 such that a space 58 is defined between the second tab portion 50 and the bottom surface 32. The space 58 extends between the pair of sidelong edges 54 of the second tab portion 50. Each of the front side 40 and the back side 42 and the first lateral side 36 and the second lateral side 38 of the perimeter edge 34 of the panel 24 is folded over onto the bottom surface 32. Furthermore, each of the front side 40 and the back side 42 and the first lateral side 36 and the second lateral side 38 is coupled to the bottom surface 32 to inhibit any of the front side 40 or the back side 42 or the first lateral side 36 or the second lateral side 38 from fraying.

Each of the first lateral side 36 and the second lateral side 38 may have a length ranging between approximately 35.0 cm and 45.0 cm and each of the top side and the bottom side may have a length ranging between approximately 27.0 cm and 37.0 cm. Each of the lateral edges 48 and the frontmost edge 46 of the first tab portion 44 may have a length ranging between approximately 7.5 cm and 10.0 cm Additionally, each of the pair of sidelong edges 54 of the second tab portion 50 may have a length ranging between approximately 4.0 cm and 5.0 cm and the rearmost edge 52 of the second tab portion 50 may have a length ranging between approximately 10.0 cm and 13.0 cm. Furthermore, stitching 59 may be employed to secure each of the first tab portion 44 and the second tab portion 50 and the perimeter edge 34 to the bottom surface 32 of the panel 24.

The hole 26 in the panel 24 extends through the top surface 30 and the bottom surface 32 of the panel 24 and the hole 26 is centrally positioned between the first lateral side 36 and the second lateral side 38 of the perimeter edge 34 of the panel 24. Furthermore, the hole 26 is elongated along an axis extending between the first lateral side 36 and the second lateral side 38 having the hole 26 defining an ovoid shape such that the hole 26 easily accommodates the hook 18 on the refueling nozzle 12. The hook 18 of the refueling nozzle 12 is positioned adjacent to an intersection between the fuel tube 16 and the handle 14 and the hook 18 is positioned on a top side 60 of the fuel tube 16 such that the panel 24 lies on top of the fuel tube 16 when the panel 24 is in the stored position. Furthermore, the hole 26 is positioned closer to the rearmost edge 52 of the second tab portion 50 than the frontmost edge 46 of the first tab portion 44 such that the panel 24 extends beyond a distal end 62 of the fuel tube 16 when the hook 18 is inserted through the hole 26.

A first hose clamp 64 is secured around the fuel tube 16 of the refueling nozzle 12 having the first hose clamp 64 being positioned closer to the hook 18 than the distal end 62 of the fuel tube 16. Additionally, the first hose clamp 64 is releasably matable to itself to form a closed loop which wraps around the fuel tube 16. The first hose clamp 64 may include a coupler 66 which engages a plurality of slots 68 in the first hose clamp 64 for adjusting a diameter of the closed loop formed by the first hose clamp 64. A first magnet 70 is positioned between the first hose clamp 64 and a lower side 72 of the fuel tube 16 of the refueling nozzle 12 such that the first magnet 70 is secured to the lower side 72 of the fuel tube 16.

A second hose clamp 74 is provided and the second hose clamp 74 is secured to the panel 24. The second hose clamp 74 is extendable around the fuel tube 16 of the refueling nozzle 12 thereby securing the panel 24 to the fuel tube 16. Furthermore, the second hose clamp 74 extends through the space 58 defined between the second tab portion 50 and the bottom surface 32 of the panel 24 such that the second hose clamp 74 extends outwardly from each sidelong edge 54 of the pair of sidelong edges 54 of the second tab portion 50. The second hose clamp 74 is releasably matable to itself to form a closed loop which wraps around the fuel tube 16. The second hose clamp 74 may include a coupler 76 which engages a plurality of slots 78 in the second hose clamp 74 for adjusting a diameter of the closed loop formed by the second hose clamp 74.

A second magnet 80 is provided and the second magnet 80 is secured to the panel 24. The second magnet 80 magnetically engages the first magnet 70 when the panel 24 is positioned in the stored position thereby retaining the panel 24 around the fuel tube 16 of the refueling nozzle 12. Furthermore, the second magnet 80 is distally positioned with respect to the fuel tube 16 when the panel 24 is in the deployed position. The second magnet 80 magnetically engages the fuel tank 22 to secure the panel 24 over the refueling port 20 in the fuel tank 22 when the panel 24 is in the deployed position. Additionally, the second magnet 80 is positioned in the pouch 56 between the first tab portion 44 of the perimeter edge 34 of the panel 24 and the bottom surface 32 of the panel 24.

Figure 4:
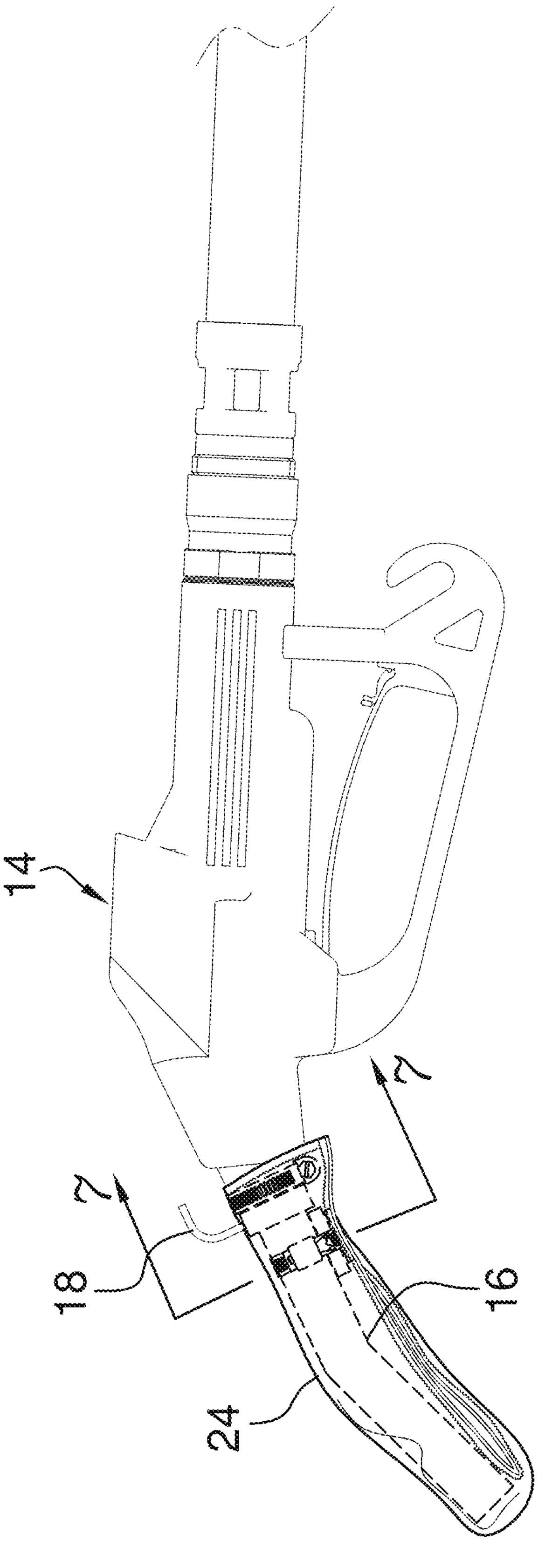
FIG. 4 is a phantom in-use view of an embodiment of the disclosure showing a panel in a stored position.
Figure 5:
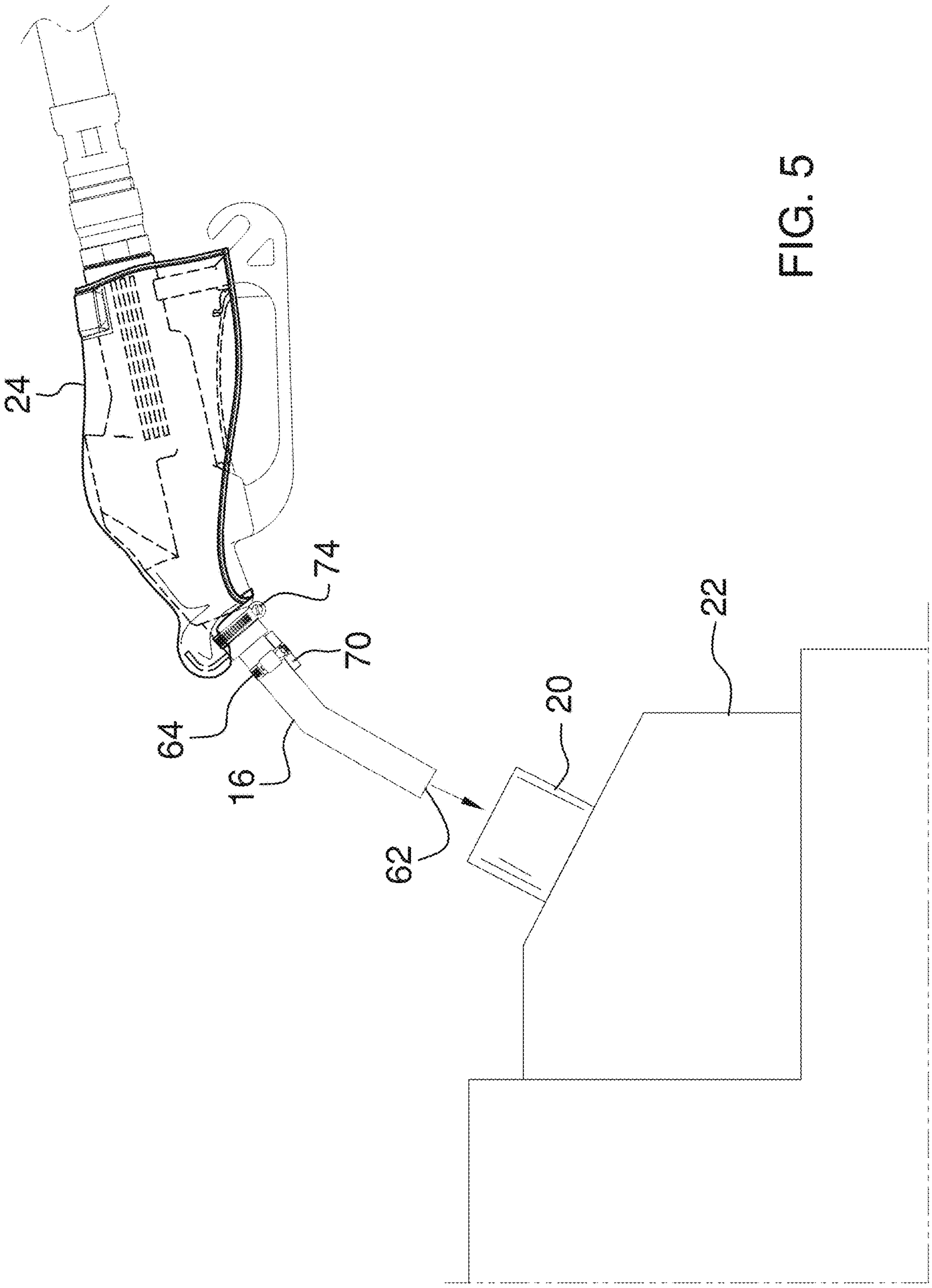
FIG. 5 is a perspective in-use view of an embodiment of the disclosure showing a fuel nozzle being inserted into a refueling port of a fuel tank.
Figure 6:
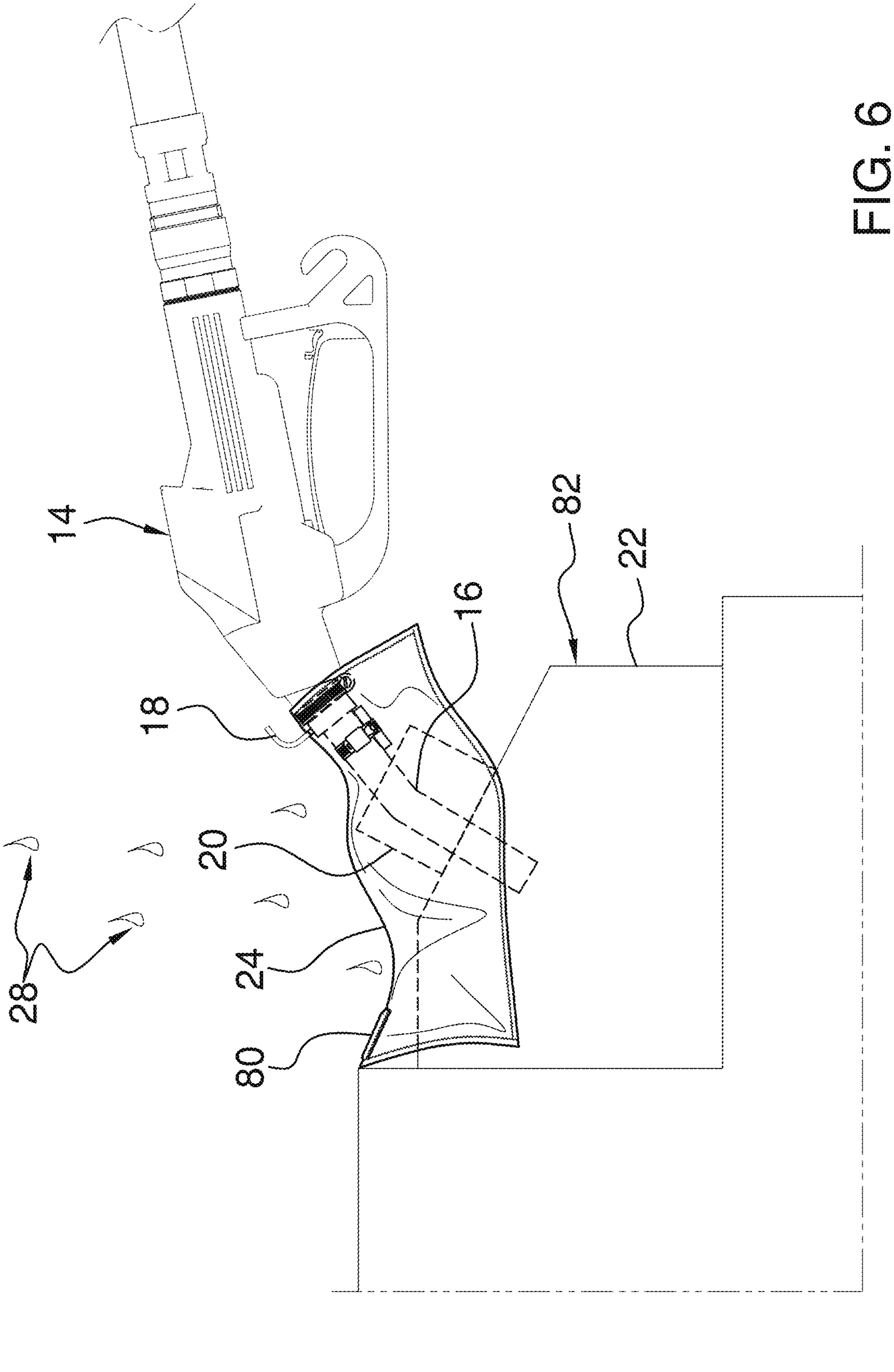
FIG. 6 is a perspective in-use view of an embodiment of the disclosure showing a panel being positioned to cover a refueling port in a fuel tank.
Figure 7:
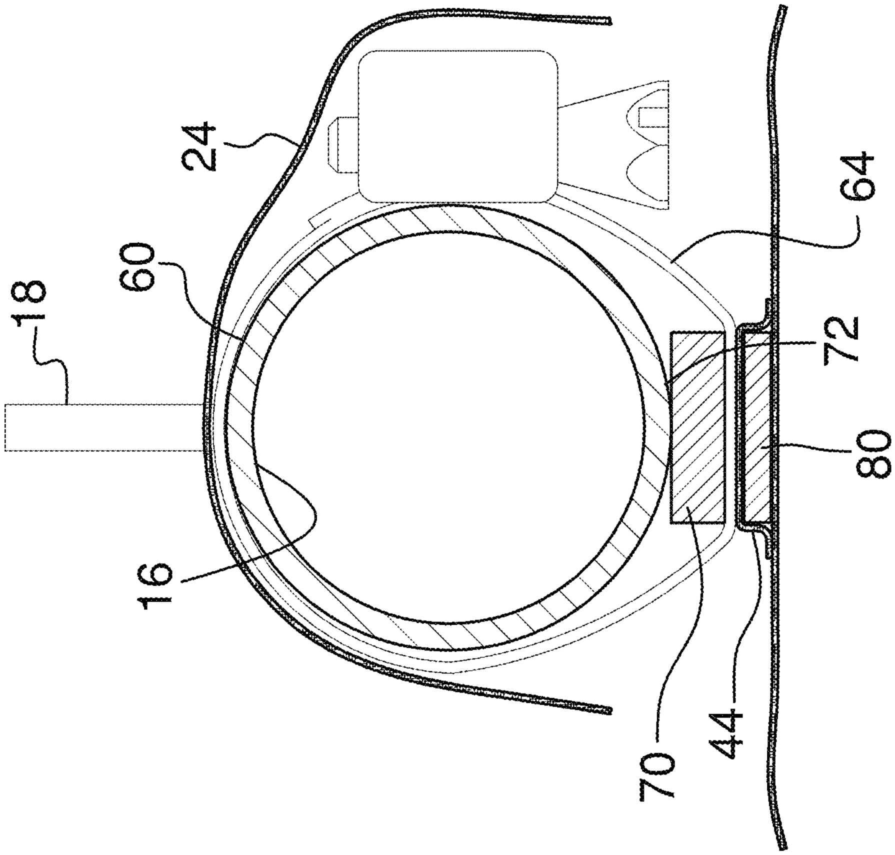
FIG. 7 is a cross sectional view taken along line 7-7 of FIG. 6 of an embodiment of the disclosure.

In use, the first hose clamp 64 is wrapped around the fuel tube 16 to secure the first magnet 70 to the lower side 62 of the fuel tube 16. The second hose clamp 74 is extended through the space 58 defined between the second tab portion 50 and the bottom surface 32 of the panel 24 and the second hose clamp 74 is wrapped around the fuel tube 16 to secure the panel 24 to the fuel tube 16. The panel 24 is wrapped around the distal end 62 of the fuel tube 16 and the second magnet 80 is positioned to magnetically engage the first magnet 70 to secure the panel 24 around the fuel tube 16. As is shown in FIG. 5, the second magnet 80 is removed from the first magnet 70 and the panel 24 is pulled over the handle 14 of the refueling nozzle to expose the fuel tube 16 such that the fuel tube 16 can be inserted into the refueling port 20 of the fuel tank 22. As is shown in FIG. 6, the panel 24 is draped over each of the fuel tube 16 and the refueling port 20 such that the second magnet 80 can magnetically engage an outer wall 82 of the fuel tank 22 when the fuel tube 16 is inserted into the refueling port 20. Furthermore, the panel 24 inhibits contaminants 28 from entering the refueling port 20 while the fuel tank 22 is being refueled. As is shown in FIG. 4, the second magnet 80 is removed from the outer wall 82 of the fuel tank 22 and the second magnet 80 is magnetically engaged to the first magnet 70 when the fuel tube 16 is removed from the refueling port 20 to wrap the panel 24 around the fuel tube 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A refueling nozzle cover device for inhibiting contaminants from entering a fuel port in a fuel tank during refueling, said device comprising:

a refueling nozzle having a handle and a fuel tube and a hook extending upwardly from said fuel tube wherein said fuel tube is configured to be inserted into the refueling port of the fuel tank for refueling the fuel tank;

a panel having a hole extending through said panel, said hole insertably receiving said hook thereby attaching said panel to said refueling nozzle, said panel being comprised of a flexible material such that said panel is positionable in a stored position having said panel being draped over said handle of said refueling nozzle when said refueling nozzle is not being employed for refueling, said panel being positionable in a deployed position having said panel extending beyond said fuel tube of said refueling nozzle wherein said panel is configured to cover the refueling port of the fuel tank into which said fuel tube is inserted to inhibit contaminants from passing into the refueling port while the fuel tank is being refueled;

a first hose clamp being secured around said fuel tube of said refueling nozzle;

a first magnet being secured between said first hose clamp and said fuel tube of said refueling nozzle;

a second hose clamp being secured to said panel, said second hose clamp being extendable around said fuel tube of said refueling nozzle thereby securing said panel to said fuel tube; and a second magnet being secured to said panel, said second magnet magnetically engaging said first magnet when said panel is positioned in said stored position thereby retaining said panel around said fuel tube of said refueling nozzle, said second magnet being distally positioned with respect to said fuel tube when said panel is in said deployed position wherein said second magnet is configured to magnetically engage the fuel tank to secure said panel over the refueling port in the fuel tank.

2. The device according to claim 1, wherein:

said panel has a top surface and a bottom surface and a perimeter edge extending between said top surface and said bottom surface;

said perimeter edge has a first lateral side and a second lateral side and a front side and a back side;

said front side has a first tab portion which has a frontmost edge extending between pair of lateral edges;

each lateral edge of said pair of lateral edges is oriented perpendicular to said front side having said frontmost edge being oriented parallel to said front side;

said first tab portion is centrally located between said first lateral side and said second lateral side of said perimeter edge of said panel;

back side of said perimeter edge of said panel having a second tab portion which has a rearmost edge extending between a pair of sidelong edges;

each sidelong edge of said pair of sidelong edges is oriented perpendicular to said back side having said rearmost edge being oriented parallel to said back side; and said second tab portion is centrally located between said first lateral side and said second lateral side of said perimeter edge of said panel.

3. The device according to claim 2, wherein said first tab portion is folded over onto said bottom surface of said panel having each of said pair of lateral edges and said frontmost edge being coupled to said bottom surface to define a pouch between said first tab portion and said bottom surface of said panel.

4. The device according to claim 3, wherein said second magnet is positioned in said pouch between said first tab portion of said perimeter edge of said panel and said bottom surface of said panel.

5. The device according to claim 2, wherein:

said second tab portion is folded over onto said bottom surface of said panel having said rearmost edge being coupled to said bottom surface such that a space is defined between said second tab portion and said bottom surface; and said space extends between said pair of sidelong edges of said second tab portion.

6. The device according to claim 5, wherein:

said second hose clamp extends through said space defined between said second tab portion and said bottom surface of said panel such that said second hose clamp extends outwardly from each sidelong edge of said pair of sidelong edges of said second tab portion; and said second hose clamp is releasably matable to itself to form a closed loop which wraps around said fuel tube.

7. The device according to claim 2, wherein:

each of said front side and said back side and said first lateral side and said second lateral side of said perimeter edge of said panel is folded over onto said bottom surface; and each of said front side and said back side and said first lateral side and said second lateral side is coupled to said bottom surface to inhibit any of said front side or said back side or said first lateral side or said second lateral side from fraying.

8. The device according to claim 2, wherein:

said hole in said panel extends through said top surface and said bottom surface of said panel; and said hole is centrally positioned between said first lateral side and said second lateral side of said perimeter edge of said panel.

9. The device according to claim 2, wherein said hole is elongated along an axis extending between said first lateral side and said second lateral side of said perimeter edge of said panel having said hole defining an ovoid shape such that said hole easily accommodates said hook on said refueling nozzle.

10. The device according to claim 2, wherein said hole is positioned closer to said rearmost edge of said second tab portion than said frontmost edge of said first tab portion such that said panel extends beyond a distal end of the fuel tube when said hook is inserted through said hole.

11. The device according to claim 1, wherein:

said hook of said refueling nozzle is positioned adjacent to an intersection between said fuel tube and said handle; and said hook is positioned on a top side of said fuel tube such that said panel lies on top of said fuel tube when said panel is in said stored position.

12. The device according to claim 1, wherein:

said first hose clamp is positioned closer to said hook than a distal end of said fuel tube;

said first hose clamp is releasably matable to itself to form a closed loop which wraps around said fuel tube.

13. The device according to claim 12, wherein said first magnet is positioned between said first hose clamp and a lower side of said fuel tube of said refueling nozzle such that said first magnet is secured to said lower side of said fuel tube.

14. A refueling nozzle cover device for inhibiting contaminants from entering a fuel port in a fuel tank during refueling, said device comprising:

a refueling nozzle having a handle and a fuel tube and a hook extending upwardly from said fuel tube wherein said fuel tube is configured to be inserted into the refueling port of the fuel tank for refueling the fuel tank;

a panel having a hole extending through said panel, said hole insertably receiving said hook thereby attaching said panel to said refueling nozzle, said panel being comprised of a flexible material such that said panel is positionable in a stored position having said panel being draped over said handle of said refueling nozzle when said refueling nozzle is not being employed for refueling, said panel being positionable in a deployed position having said panel extending beyond said fuel tube of said refueling nozzle wherein said panel is configured to cover the refueling port of the fuel tank when said fuel tube is inserted into the refueling port to inhibit contaminants from passing into the refueling port while the fuel tank is being refueled, said panel having a top surface and a bottom surface and a perimeter edge extending between said top surface and said bottom surface, said perimeter edge having a first lateral side and a second lateral side and a front side and a back side, said front side having a first tab portion which has a frontmost edge extending between pair of lateral edges, each lateral edge of said pair of lateral edges being oriented perpendicular to said front side having said frontmost edge being oriented parallel to said front side, said first tab portion being centrally located between said first lateral side and said second lateral side of said perimeter edge of said panel, said first tab portion being folded over onto said bottom surface of said panel having each of said pair of lateral edges and said frontmost edge being coupled to said bottom surface to define a pouch between said first tab portion and said bottom surface of said panel, said back side of said perimeter edge of said panel having a second tab portion which has a rearmost edge extending between a pair of sidelong edges, each sidelong edge of said pair of sidelong edges being oriented perpendicular to said back side having said rearmost edge being oriented parallel to said back side, said second tab portion being centrally located between said first lateral side and said second lateral side of said perimeter edge of said panel, said second tab portion being folded over onto said bottom surface of said panel having said rearmost edge being coupled to said bottom surface such that a space is defined between said second tab portion and said bottom surface, said space extending between said pair of sidelong edges of said second tab portion, each of said front side and said back side and said first lateral side and said second lateral side of said perimeter edge of said panel being folded over onto said bottom surface, each of said front side and said back side and said first lateral side and said second lateral side being coupled to said bottom surface to inhibit any of said front side or said back side or said first lateral side or said second lateral side from fraying, said hole in said panel extending through said top surface and said bottom surface of said panel, said hole being centrally positioned between said first lateral side and said second lateral side of said perimeter edge of said panel, said hole being elongated along an axis extending between said first lateral side and said second lateral side having said hole defining an ovoid shape such that said hole easily accommodates said hook on said refueling nozzle, said hook of said refueling nozzle being positioned adjacent to an intersection between said fuel tube and said handle, said hook being positioned on a top side of said fuel tube such that said panel lies on top of said fuel tube when said panel is in said stored position, said hole being positioned closer to said rearmost edge of said second tab portion than said frontmost edge of said first tab portion such that said panel extends beyond a distal end of the fuel tube when said hook is inserted through said hole;

a first hose clamp being secured around said fuel tube of said refueling nozzle having said first hose clamp being positioned closer to said hook than said distal end of said fuel tube, said first hose clamp being releasably matable to itself to form a closed loop which wraps around said fuel tube;

a first magnet being positioned between said first hose clamp and a lower side of said fuel tube of said refueling nozzle such that said first magnet is secured to said lower side of said fuel tube;

a second hose clamp being secured to said panel, said second hose clamp being extendable around said fuel tube of said refueling nozzle thereby securing said panel to said fuel tube, said second hose clamp extending through said space defined between said second tab portion and said bottom surface of said panel such that said second hose clamp extends outwardly from each sidelong edge of said pair of sidelong edges of said second tab portion, said second hose clamp being releasably matable to itself to form a closed loop which wraps around said fuel tube; and a second magnet being secured to said panel, said second magnet magnetically engaging said first magnet when said panel is positioned in said stored position thereby retaining said panel around said fuel tube of said refueling nozzle, said second magnet being distally positioned with respect to said fuel tube when said panel is in said deployed position wherein said second magnet is configured to magnetically engage the fuel tank to secure said panel over the refueling port in the fuel tank, said second magnet being positioned in said pouch between said first tab portion of said perimeter edge of said panel and said bottom surface of said panel.

* * * * *